(12) United States Patent
Wilkinson, III et al.

(10) Patent No.: US 7,181,594 B2
(45) Date of Patent: Feb. 20, 2007

(54) CONTEXT PIPELINES

(75) Inventors: Hugh M. Wilkinson, III, Newton, MA (US); Mark B. Rosenbluth, Uxbridge, MA (US); Matthew J. Adiletta, Worcester, MA (US); Debra Bernstein, Sudbury, MA (US); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 10/057,723

(22) Filed: Jan. 25, 2002

(65) Prior Publication Data

US 2003/0145173 A1  Jul. 31, 2003

(51) Int. Cl.
*G06F 9/312* (2006.01)

(52) U.S. Cl. .......................... 712/11; 712/228
(58) Field of Classification Search .............. 712/11, 712/228
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,940,745 A | 2/1976 | Sajeva |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,745,544 A | 5/1988 | Renner et al. |
| 4,866,664 A | 9/1989 | Burkhardt, Jr. et al. |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,255,239 A | 10/1993 | Taborn et al. |
| 5,263,169 A | 11/1993 | Genusov et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |

(Continued)

FOREIGN PATENT DOCUMENTS

EP          0 379 709          8/1990

(Continued)

OTHER PUBLICATIONS

U.S. Appl. No. 09/473,571, filed Dec. 28, 1999, Wolrich et al.

(Continued)

*Primary Examiner*—Eric Coleman
(74) *Attorney, Agent, or Firm*—Fish & Richardson P.C.

(57) ABSTRACT

A method of parallel hardware-based multithreaded processing is described. The method includes assigning tasks for packet processing to programming engines and establishing pipelines between programming stages, which correspond to the programming engines. The method also includes establishing contexts for the assigned tasks on the programming engines and using a software controlled cache such as a CAM to transfer data between next neighbor registers residing in the programming engines.

38 Claims, 6 Drawing Sheets

U.S. PATENT DOCUMENTS

| | | | |
|---|---|---|---|
| 5,392,412 A | 2/1995 | McKenna |
| 5,404,464 A | 4/1995 | Bennett |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,644,623 A | 7/1997 | Gulledge |
| 5,649,157 A | 7/1997 | Williams |
| 5,659,687 A | 8/1997 | Kim et al. |
| 5,680,641 A | 10/1997 | Sidman |
| 5,689,566 A | 11/1997 | Nguyen |
| 5,689,722 A | 11/1997 | Swarztrauber |
| 5,699,537 A | 12/1997 | Sharangpani et al. |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A * | 4/1998 | Motomura ................. 718/102 |
| 5,745,913 A | 4/1998 | Pattin et al. |
| 5,751,987 A | 5/1998 | MahantShetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,905,876 A | 5/1999 | Pawlowski et al. |
| 5,905,889 A | 5/1999 | Wilhelm, Jr. |
| 5,913,059 A | 6/1999 | Torii |
| 5,915,123 A | 6/1999 | Mirsky et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,983,274 A | 11/1999 | Hyder et al. |
| 6,006,321 A * | 12/1999 | Abbott ....................... 712/43 |
| 6,012,151 A | 1/2000 | Mano |
| 6,014,729 A | 1/2000 | Lannan et al. |
| 6,023,742 A | 2/2000 | Ebeling et al. |
| 6,058,168 A | 5/2000 | Braband |
| 6,067,300 A * | 5/2000 | Baumert et al. ............ 370/413 |
| 6,067,585 A | 5/2000 | Hoang |
| 6,070,231 A | 5/2000 | Ottinger |
| 6,072,781 A | 6/2000 | Feeney et al. |
| 6,073,159 A | 6/2000 | Emer et al. |
| 6,073,215 A | 6/2000 | Snyder |
| 6,079,008 A | 6/2000 | Clery, III |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,170,051 B1 * | 1/2001 | Dowling ..................... 712/225 |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,266,760 B1 * | 7/2001 | DeHon et al. ................ 712/15 |
| 6,272,616 B1 | 8/2001 | Fernando et al. |
| 6,275,505 B1 | 8/2001 | O Loughlin et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,324,624 B1 | 11/2001 | Wolrich et al. |
| 6,327,650 B1 * | 12/2001 | Bapst et al. ................ 712/228 |
| 6,345,334 B1 | 2/2002 | Nakagawa et al. |
| 6,347,344 B1 | 2/2002 | Baker et al. |
| 6,356,962 B1 | 3/2002 | Kasper |
| 6,360,262 B1 | 3/2002 | Guenthner et al. |
| 6,373,848 B1 | 4/2002 | Allison et al. |
| 6,389,449 B1 | 5/2002 | Nemirovsky et al. |
| 6,393,483 B1 | 5/2002 | Latif et al. |
| 6,415,338 B1 | 7/2002 | Habot |
| 6,426,940 B1 | 7/2002 | Seo et al. |
| 6,427,196 B1 | 7/2002 | Adiletta et al. |
| 6,430,626 B1 | 8/2002 | Witkowski et al. |
| 6,434,145 B1 | 8/2002 | Opsasnick et al. |
| 6,463,072 B1 | 10/2002 | Wolrich et al. |
| 6,532,509 B1 | 3/2003 | Wolrich et al. |
| 6,552,826 B2 | 4/2003 | Adler et al. |
| 6,560,667 B1 | 5/2003 | Wolrich et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,661,794 B1 | 12/2003 | Wolrich et al. |
| 6,665,755 B2 * | 12/2003 | Modelski et al. ............ 710/100 |

| | | |
|---|---|---|
| 6,667,920 B2 | 12/2003 | Wolrich et al. |
| 6,668,317 B1 | 12/2003 | Bernstein et al. |
| 6,681,300 B2 | 1/2004 | Wolrich et al. |
| 6,694,380 B1 | 2/2004 | Wolrich et al. |
| 6,718,457 B2 | 4/2004 | Tremblay et al. |
| 6,745,317 B1 * | 6/2004 | Mirsky et al. ............ 712/11 |
| 2002/0116587 A1 | 8/2002 | Modelski et al |
| 2003/0067913 A1 | 4/2003 | Georgiou et al. |
| 2003/0135351 A1 | 7/2003 | Adiletta et al. |
| 2003/0145159 A1 | 7/2003 | Adiletta et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| EP | 1 148 414 | 10/2001 |
| JP | 59-111533 | 6/1984 |
| WO | WO 94/15287 | 7/1994 |
| WO | WO 97/38372 | 10/1997 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 01/95101 | 12/2001 |

OTHER PUBLICATIONS

U.S. Appl. No. 09/475,614, filed Dec. 30, 1999, Wolrich et al.

Byrd et al., "Multithread Processor Architectures," *IEEE Spectrum*, vol. 32, No. 8, New York, Aug. 1, 1995, pp. 38-46.

Doyle et al., *Microsoft Press Computer Dictionary*, 2nd ed., Microsoft Press, Redmond, Washington, USA, 1994, p. 326.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Moors, et al., "Cascading Content-Addressable Memories", *IEEE Micro*, 12(3):56-66 (1992).

Schmidt et al., "The Performance of Alternative Threading Architectures for Parallel Communication Subsytems," Internet Document, *Online!*, Nov. 13, 1998.

Shah, Niraj, "Understanding Network Processors", *Masters Thesis Submitted to the University of California, Berkeley*, Sep. 4, 2001.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

International Search Report from PCT/US03/01578; mailed Feb. 19, 2004 (4 pages).

International Search Report from PCT/US03/01580; mailed Apr. 21, 2004. (4 pages).

\* cited by examiner

CONTEXT PIPELINES

BACKGROUND

Parallel processing is an efficient form of information processing of concurrent events in a computing process. Parallel processing demands concurrent execution of many programs in a computer, in contrast to sequential processing. In the context of a parallel processor, parallelism involves doing more than one thing at the same time. Unlike a serial paradigm where all tasks are performed sequentially at a single station or a pipelined machine where tasks are performed at specialized stations, with parallel processing, many stations are provided, each capable of performing various tasks simultaneously. A number of stations work simultaneously and independently on the same or common elements of a computing task. Accordingly, using or applying parallel processing can solve computing tasks.

DESCRIPTION

Architecture

Figure 1:
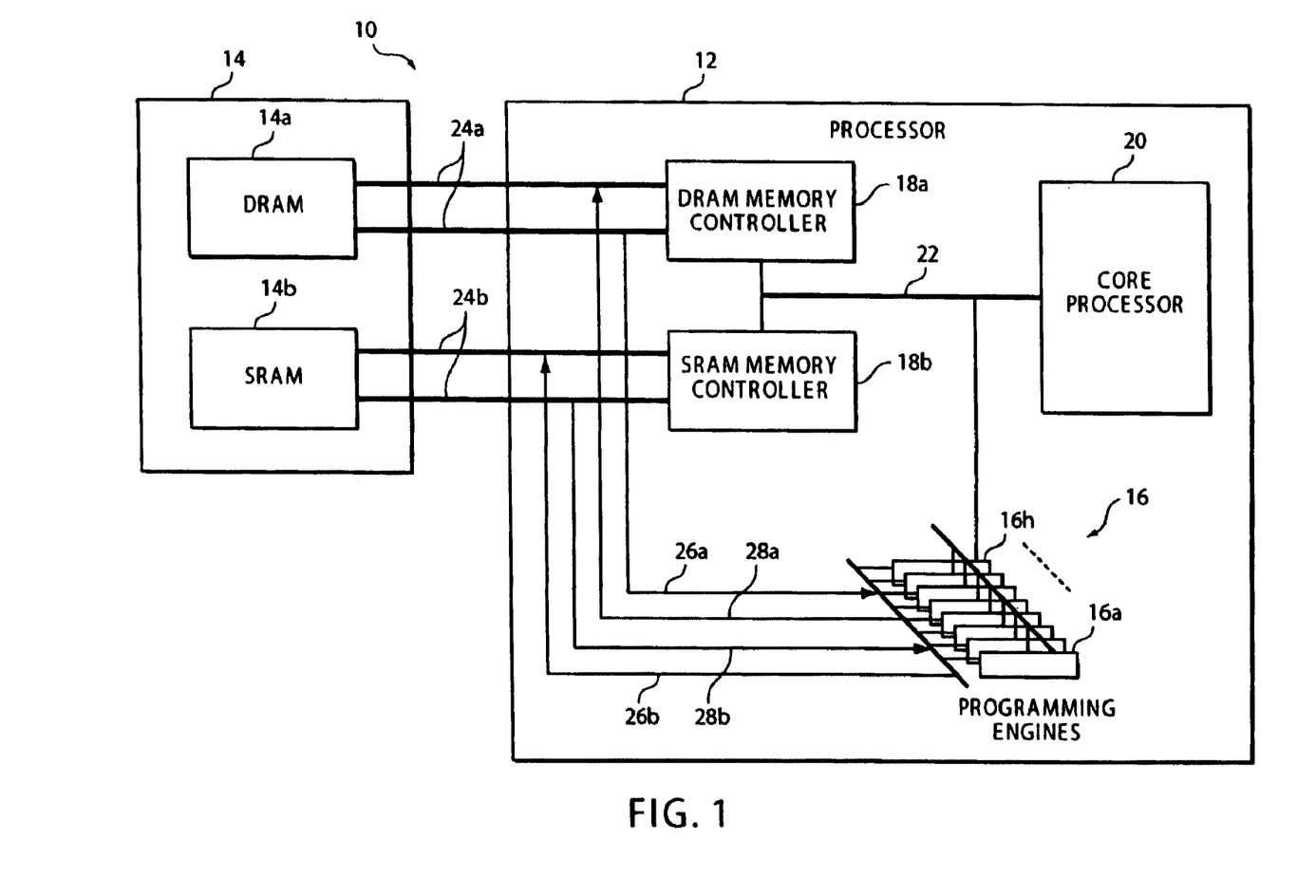
FIG. 1 is a block diagram of a communication system employing a hardware-based multithreaded processor.

Referring to FIG. 1, a computer processing system 10 includes a parallel, hardware-based multithreaded network processor 12. The hardware-based multithreaded processor 12 is coupled to a memory system or memory resource 14. Memory system 14 includes dynamic random access memory (DRAM) 14a and static random access memory 14b (SRAM). The processing system 10 is especially useful for tasks that can be broken into parallel subtasks or functions. Specifically, the hardware-based multithreaded processor 12 is useful for tasks that are bandwidth oriented rather than latency oriented. The hardware-based multi-threaded processor 12 has multiple functional microengines or programming engines 16 each with multiple hardware controlled threads that are simultaneously active and independently work on a specific task.

The programming engines 16 each maintain program counters in hardware and states associated with the program counters. Effectively, corresponding sets of context or threads can be simultaneously active on each of the programming engines 16 while only one is actually operating at any one time.

In this example, eight programming engines 16a–16h are illustrated in FIG. 1. Each engine from the programming engines 16a–16h processes eight hardware threads or contexts. The eight programming engines 16a–16h operate with shared resources including memory resource 14 and bus interfaces (not shown). The hardware-based multithreaded processor 12 includes a dynamic random access memory (DRAM) controller 18a and a static random access memory (SRAM) controller 18b. The DRAM memory 14a and DRAM controller 18a are typically used for processing large volumes of data, e.g., processing of network payloads from network packets. The SRAM memory 14b and SRAM controller 18b are used in a networking implementation for low latency, fast access tasks, e.g., accessing look-up tables, memory for the core processor 20, and the like.

The eight programming engines 16a–16h access either the DRAM memory 14a or SRAM memory 14b based on characteristics of the data. Thus, low latency, low bandwidth data is stored in and fetched from SRAM memory 14b, whereas higher bandwidth data for which latency is not as important, is stored in and fetched from DRAM memory 14a. The programming engines 16a–16h can execute memory reference instructions to either the DRAM controller 18a or SRAM controller 18b.

The hardware-based multithreaded processor 12 also includes a processor core 20 for loading microcode control for the programming engines 16a–16h. In this example, the processor core 20 is an XScale™ based architecture.

The processor core 20 performs general purpose computer type functions such as handling protocols, exceptions, and extra support for packet processing where the programming engines 16 pass the packets off for more detailed processing such as in boundary conditions.

The processor core 20 has an operating system (not shown). Through the operating system (OS), the processor core 20 can call functions to operate on the programming engines 16a–16h. The processor core 20 can use any supported OS, in particular, a real time OS. For the core processor 20 implemented as an XScale™ architecture, operating systems such as Microsoft NT real-time, VXWorks and µCOS, or a freeware OS available over the Internet can be used.

Advantages of hardware multithreading can be explained by SRAM or DRAM memory accesses. As an example, an SRAM access requested by a context (e.g., Thread_0), from one of the programming engines 16 will cause the SRAM controller 18b to initiate an access to the SRAM memory 14b. The SRAM controller 18b accesses the SRAM memory 14b, fetches the data from the SRAM memory 14b, and returns data to a requesting programming engine 16.

During an SRAM access, if one of the programming engines 16a–16h had only a single thread that could operate, that programming engine would be dormant until data was returned from the SRAM memory 14b.

By employing hardware context swapping within each of the programming engines 16a–16h, the hardware context swapping enables other contexts with unique program counters to execute in that same programming engine. Thus, another thread e.g., Thread_1 can function while the first thread, Thread_0, is awaiting the read data to return. During execution, Thread_1 may access the DRAM memory 14a. While Thread_1 operates on the DRAM unit, and Thread_0 is operating on the SRAM unit, a new thread, e.g., Thread_2 can now operate in the programming engine 16. Thread_2 can operate for a certain amount of time until it needs to access memory or perform some other long latency operation, such as making an access to a bus interface. Therefore, simultaneously, the multi-threaded processor 12 can have a bus operation, an SRAM operation, and a DRAM operation all being completed or operated upon by one of the programming engines 16 and have one more threads or contexts available to process more work.

The hardware context swapping also synchronizes the completion of tasks. For example, two threads can access the shared memory resource, e.g., the SRAM memory 14b. Each one of the separate functional units, e.g., the SRAM controller 18*b*, and the DRAM controller 18*a*, when they complete a requested task from one of the programming engine threads or contexts reports back a flag signaling completion of an operation. When the programming engines 16*a*–16*h* receive the flag, the programming engines 16*a*–16*h* can determine which thread to turn on.

One example of an application for the hardware-based multithreaded processor 12 is as a network processor. As a network processor, the hardware-based multithreaded processor 12 interfaces to network devices such as a Media Access Controller (MAC) device, e.g., a 10/100BaseT Octal MAC or a Gigabit Ethernet device. In general, as a network processor, the hardware-based multithreaded processor 12 can interface to any type of communication device or interface that receives or sends large amount of data. The computer processing system 10 functioning in a networking application can receive network packets and process those packets in a parallel manner.

Programming Engines

Figure 2:
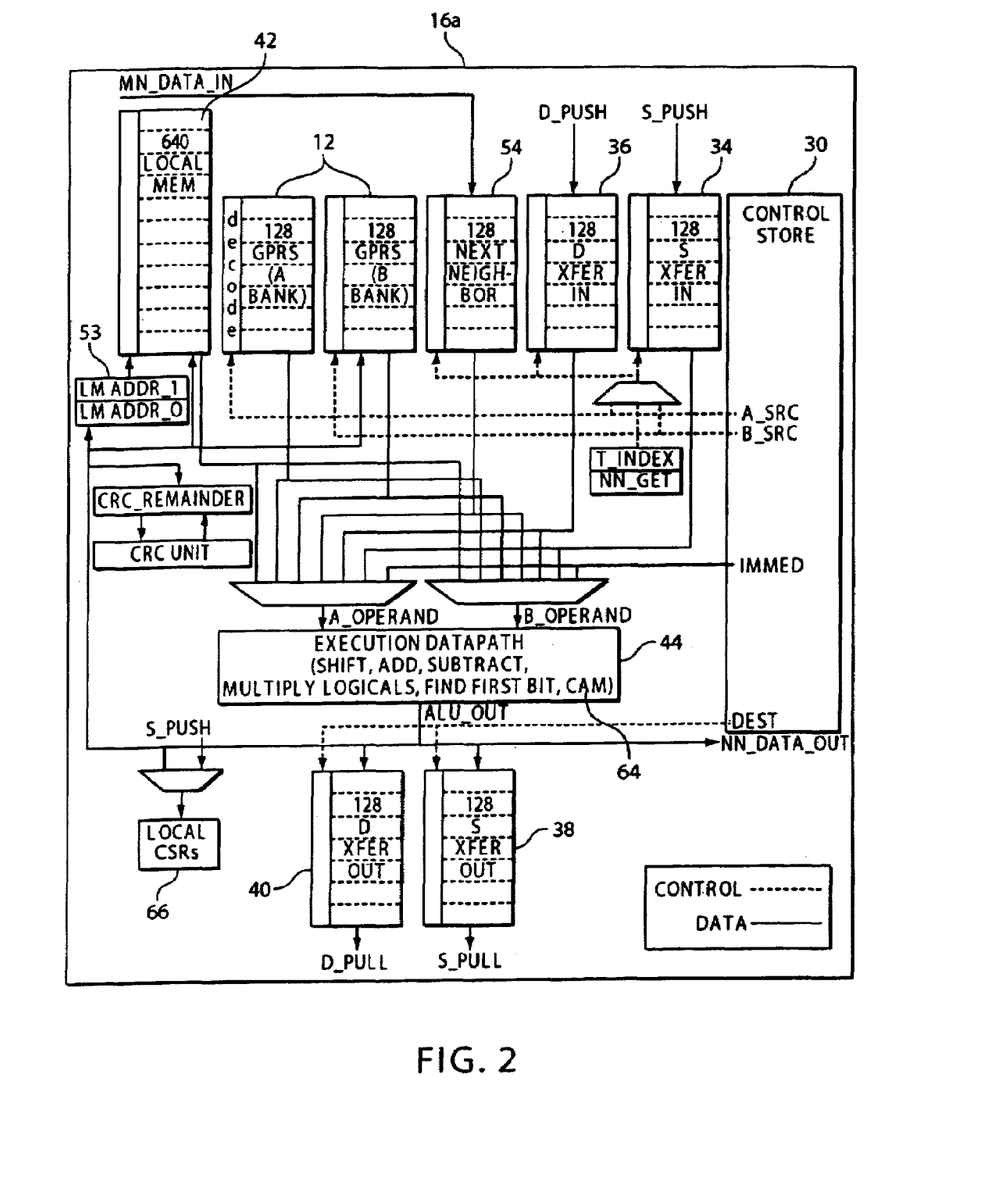
FIG. 2 is a block diagram of a programming engine functional unit employed in the hardware-based multi-threaded processor of FIG. 1.

Referring to FIG. 2, one exemplary programming engine 16*a* from the programming engines 16*a*–16*h*, is shown. The programming engine 16*a* includes a control store 30, which in one example includes a RAM of 4096 instructions, each of which is 40-bits wide. The RAM stores a microprogram that the programming engine 16*a* executes. The microprogram in the control store 30 is loadable by the processor core 20 (FIG. 1).

In addition to event signals that are local to an executing thread, the programming engine 16*a* employs signaling states that are global. With signaling states, an executing thread can broadcast a signal state to all programming engines 16*a*–16*h*. Any and all threads in the programming engines can branch on these signaling states. These signaling states can be used to determine availability of a resource or whether a resource is due for servicing. The context event logic has arbitration for the eight (8) threads. In one example, the arbitration is a round robin mechanism. Other techniques could be used including priority queuing or weighted fair queuing.

As described above, the programming engine 16*a* supports multi-threaded execution of eight contexts. This allows one thread to start executing just after another thread issues a memory reference and must wait until that reference completes before doing more work. Multi-threaded execution is critical to maintaining efficient hardware execution of the programming engine 16*a* because memory latency is significant. Multi-threaded execution allows the programming engines 16 to hide memory latency by performing useful independent work across several threads.

The programming engine 16*a*, to allow for efficient context swapping, has its own register set, program counter, and context specific local registers. Having a copy per context eliminates the need to move context specific information to and from shared memory and programming engine registers for each context swap. Fast context swapping allows a context to do computation while other contexts wait for input-output (I/O), typically, external memory accesses to complete or for a signal from another context or hardware unit.

For example, the programming engine 16*a* executes the eight contexts by maintaining eight program counters and eight context relative sets of registers. There can be six different types of context relative registers, namely, general purpose registers (GPRs) 32, inter-programming agent registers (not shown), Static Random Access Memory (SRAM) input transfer registers 34, Dynamic Random Access Memory (DRAM) input transfer registers 36, SRAM output transfer registers 38, DRAM output transfer registers 40.

The GPRs 32 are used for general programming purposes. The GPRs 32 are read and written exclusively under program control. The GPRs 32, when used as a source in an instruction, supply operands to an execution datapath 44. When used as a destination in an instruction, the GPRs 32 are written with the result of the execution datapath 44. The programming engine 16*a* also includes I/O transfer registers 34, 36, 38 and 40 which are used for transferring data to and from the programming engine 16*a* and locations external to the programming engines 16*a*, e.g., the DRAM memory 14*a*, the SRAM memory 14*b*, etc.

A local memory 42 is also used. The local memory 42 is addressable storage located in the programming engine 16*a*. The local memory 42 is read and written exclusively under program control. The local memory 42 also includes variables shared by all the programming engines 16*a*–16*h*. Shared variables are modified in various assigned tasks during functional pipeline stages by the programming engines 16*a*–16*h*, which are described next. The shared variables include a critical section, defining the read-modify-write times. The implementation and use of the critical section in the computing processing system 10 is also described below.

Programming Engine Contexts

Each of the programming engine 16 supports multi-threaded execution of eight contexts. One reason for this is to allow one thread to start executing just after another thread issues a memory reference and must wait until that reference completes before doing more work. This behavior is critical to maintaining efficient hardware execution of the programming engines 16*a*–16*f* because memory latency is significant. Stated differently, if only a single thread execution was supported, the programming engine would sit idle for a significant number of cycles waiting for references to complete and thereby reduce overall computational throughput. Multi-threaded execution allows a programming engine to hide memory latency by performing useful independent work across several threads.

The programming engines 16*a*–16*h* each have eight available contexts. To allow for efficient context swapping, each of the eight contexts in the programming engine has its own register set, program counter, and context specific local registers. Having a copy per context eliminates the need to move context specific information to/from shared memory and programming engine registers for each context swap. Fast context swapping allows a context to do computation while other contexts wait for I/O, typically external memory accesses, to complete or for a signal from another context or hardware unit.

Figure 3:
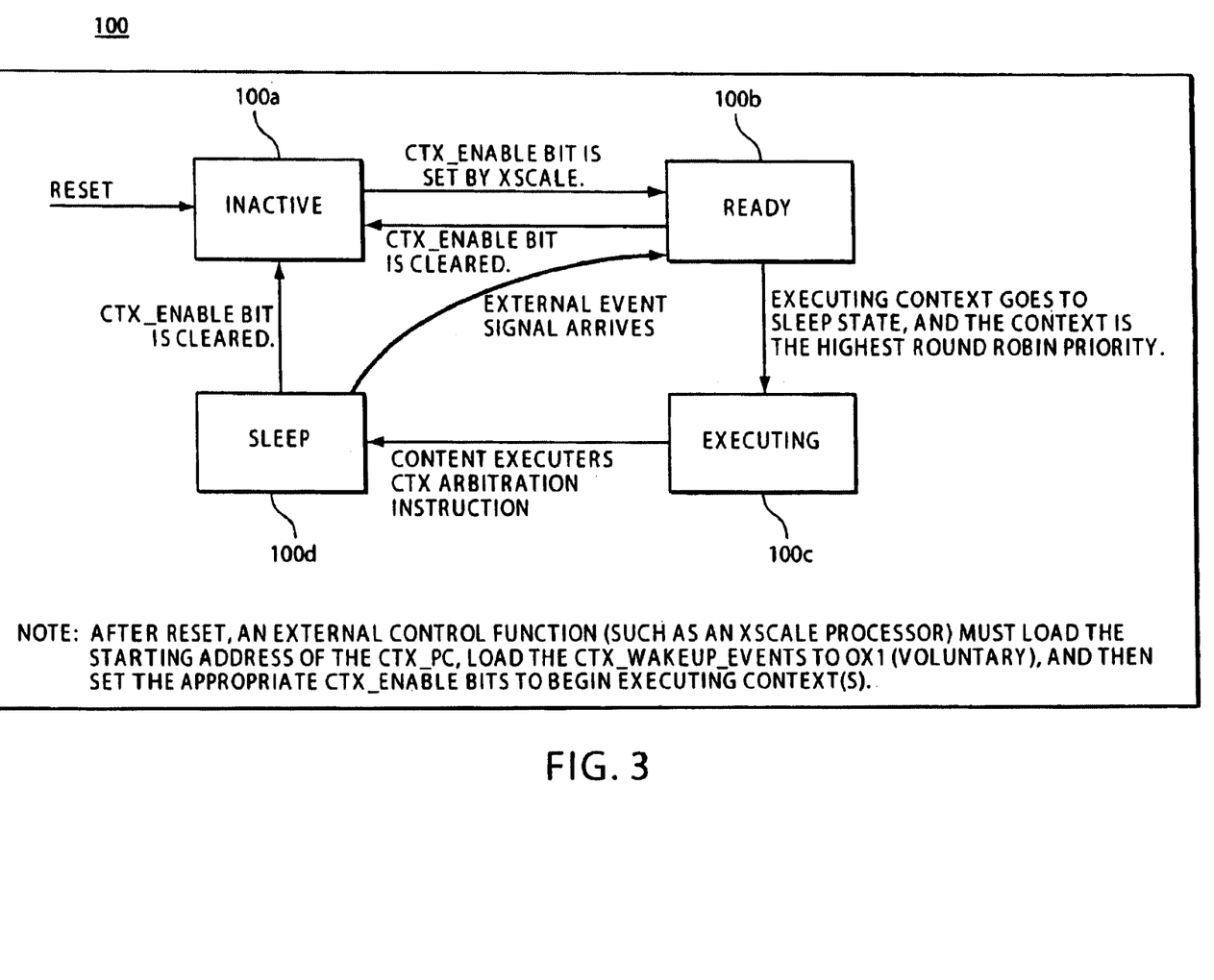
FIG. 3 is a block diagram of a context state transition.

Accordingly, FIG. 3 illustrates the state transitions 100 for a context. Each of the eight contexts will be in one of the states described above. At most, one context can be in the executing state at a time and any number of contexts can be in any of the other states:

1) Inactive state (100*a*)—Because some applications may not require all eight contexts, a context is in the inactive state when its CTX_Enable (Context Enable) Control and Status Register (CSR) enable bit is a '0'.

2) Ready state (100*b*)—In this state, although a context is ready to execute, the context cannot proceed because a different context is still executing. When the executing context goes to a sleep state, the programming engine's context arbiter selects the next context to go to the executing state from among all the contexts in the ready state. The arbitration is round robin.

3) Executing state (100*c*)—A context is in an executing state when its context number is in Active_CTX_Status CSR. The executing context's programming counter (not shown) is used to fetch instructions from the control store 50. A context remains in the executing state until it executes an instruction that causes it to enter the sleep state. At most, one context can be in the executing state at any time.

4) Sleep state (100*d*)—A context is waiting for external event(s)specified in the CTX_#_Wakeup_Events CSR to occur where # indicates eight different contexts such as context #0 through #7, typically, but not limited to, an I/O access. In this state, the context does not arbitrate to enter the executing state.

Returning to FIG. 2, each programming engine 22 includes four types of 32-bit datapath registers as described below. The 256 general purpose registers, 128 next neighbor registers, 512 transfer registers, and 640 32-bit words of local memory.

General Purpose Registers

The programming engine 16*a* includes General Purpose Registers (GPRs) 52 which are used for general programming purposes. They are read and written exclusively under program control. The GPRs 52, when used as a source in an instruction, supply operands to an execution datapath 56. When used as a destination in an instruction, the GPRs 52 are written with the result of the execution datapath 56. The GPRs 52 are physically and logically contained in two banks, GPR A 52*a* and GPR B 52*b*, as illustrated in FIG. 3.

Transfer Registers

The programming engine 16*a* also includes transfer registers 58 and 60. Transfer registers 34, 36, 38 and 40 are used for transferring data to and from the programming engine 16*a* and locations external to the programming engine, e.g., DRAMs, SRAMs etc. There are four types of transfer registers as illustrated in FIG. 2, namely, input transfer registers and output transfer registers.

The input transfer registers when used as a source in an instruction, supply operands to the execution datapath 44. The output transfer registers when used as a destination in an instruction, are written with the result from the execution datapath 44.

Local Control and Status Registers (CSRs)

Local control and status registers (CSRs) 66 are external to the execution data path 56 and hold specific purpose information. They can be read and written by special instructions (local_csr_rd and local_csr_wr) and are typically accessed less frequently than datapath registers.

Next Neighbor Registers

The programming engine 16*a* also includes 128 Next Neighbor (NN) registers 54. Each NN Register 54, when used as a source in an instruction, also supplies operands to the execution datapath 44. The NN register 54 is written either by an external entity, not limited to, an adjacent programming engine, or by the same programming engine 16*a* where the NN register 54 resides. The specific register is selected by a context-relative operation where the register number is encoded in the instruction, or as a ring operation, selected via, e.g., NN_Put (NN write address) and NN_Get (NN read address) in the CSR Registers.

NN_Put registers are used when the previous neighboring programming engine executes an instruction with NN_Put as a destination. The NN register 54 selected by the value in this register is written, and the value in NN_Put is then incremented (a value of 127 wraps back to 0). The value in this register is compared to the value in NN_Get register to determine when to assert NN_Full and NN_Empty status signals.

NN_Get registers are used when the NN register 54 is accessed as a source, which is specified in the source field of the instruction. The NN register 54 selected by the value in this register is read, and the value in NN_Put is then incremented (a value of 127 wraps back to 0). The value in this register is compared to the value in the NN_Put register to determine when to assert NN_Full and NN_Empty status signals.

Specifically, when the NN register 54 is used as a destination in an instruction, the instruction result data is sent out of the programming engine 16*a*, typically to another, adjacent programming engine. On the other hand, when the NN register 54 is used as a destination in an instruction, the instruction result data is written to the selected NN Register 54 in the programming engine 16*a*. The data is not sent out of the programming engine 22*f* as it would be when the NN register 54 is used as a destination. The NN register 54 is used in a context pipelining method, as described below.

Local Memory

The programming engine 16*a* includes 640 32-bit words in a local memory 42. Local memory 42 is addressable storage located in the programming engine 16*a*. The local memory 42 is read and written exclusively under program control. The local memory 42 supplies operands to the execution datapath 44 as a source, and receives results as a destination. The specific local memory location selected is based on the value in one of the LM_Addr registers 53, which is written by local_CSR_wr instructions. There are two LM_Addr registers 53 per context and a working copy of each. When a context goes to the sleep state 100*d*, the value of the working copies is put into the context's copy of LM_Addr. When the context goes to the executing state, the value in its copy of LM_Addr is put into the working copies. The choice of LM_Addr_0 or LM_Addr_1 is selected in the instruction. It is also possible to make use of both or one LM_Addrs as global by setting CTX_Enable [LM_Addr_0_Global] and/or CTX_Enable [LM_Addr_1_Global]. When used globally, all contexts use the working copy of LM_Addr in place of their own context specific copy.

The local memory 42 also includes variables shared by the programming engines 16*a*–16*h*. Shared variables are modified in various assigned tasks used during pipeline stages by the programming engines 16*a*–16*h*. The shared variables include a critical section which defines their read-modify-write times.

Critical Section

The pipeline stages of the programming engines 16*a*–16*h* include a minimum resolution defined by the difference between the critical section of the shared variables and the arrival time of a subsequent packet. The time allotted to the critical section must be less than the arrival time of the subsequent packet, which determines the minimum resolution of the pipeline stage. The latency of a memory read followed by the instructions to modify a variable, followed by a write, far exceeds the packet arrival rate for minimum size packets. Therefore, the critical section must be maintained to be less than the arrival time of the subsequent packet.

Execution Data Path

The programming engine 16*a* also includes the execution data path 44 that can take one or two operands, perform an operation, and optionally write back a result. The sources and destinations can be GPRs 32, transfer registers 34, 36, 38, and 40, NN register 54, and the local memory 42. The operations are shifts, add/subtract, logicals, multiply, byte align, and find first one bit. The execution data path 44 also includes a content addressable memory (CAM) 64.

Context Addressable Memory (CAM)

Figure 4:
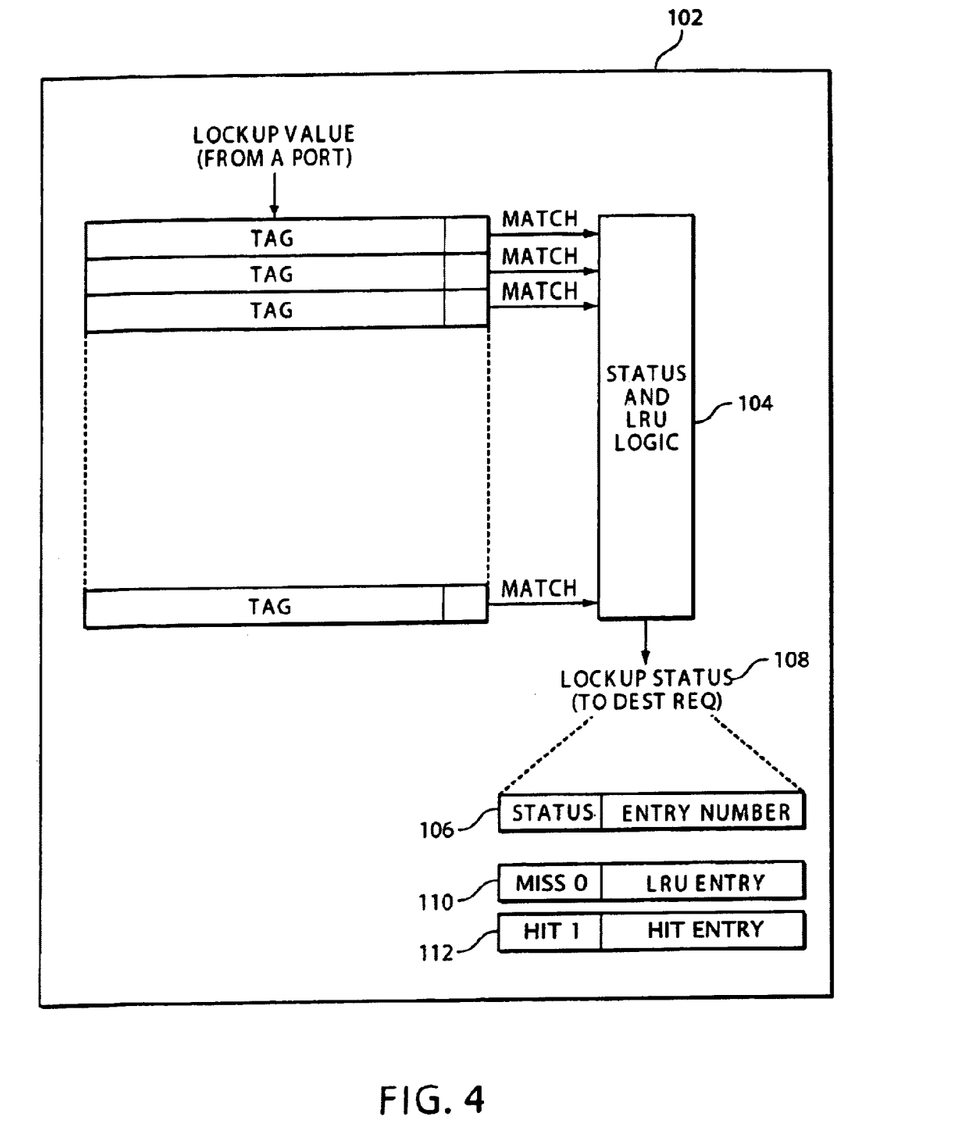
FIG. 4 is a block diagram of a context addressable memory (CAM).

FIG. 4 illustrates a CAM block diagram 102. The programming engine 16a includes the 16 entry CAM 64 with associated control logic 104. Each entry stores a 32-bit value, which can be compared against a source operand. All entries are compared in parallel and the result of the lookup is a 6-bit value. The 6-bit result consists of a 2-bit code concatenated with 4-bit entry number 106. Possible results of a lookup 108 are two fold. A first result is a miss (0) 110 where the lookup value is not in the CAM 64 and the entry number is the Least Recently Used (LRU) entry which can be used as a suggested entry to replace. The second result can be a hit (1) 112 where the lookup value is in the CAM 64, and the entry number is an entry which has matched.

The LRU Logic 104 maintains a time-ordered list of the entry usage for the CAM 64. When an entry is loaded or matches with a lookup 108, it is marked as a MRU (Most Recently Used). A lookup that misses does not modify the LRU list.

Figure 5:
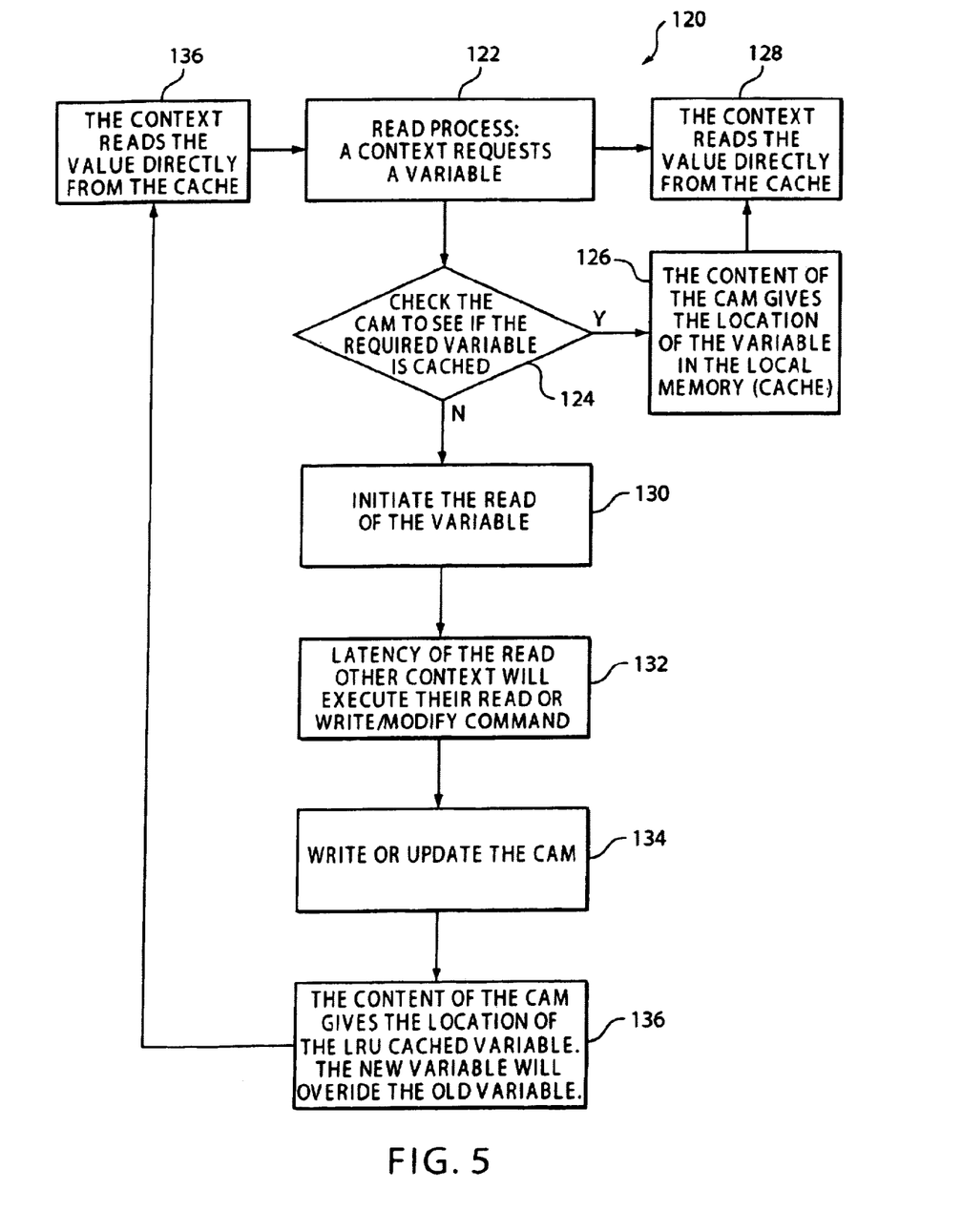
FIG. 5 is a detailed block diagram of a CAM process.

Referring to FIG. 5, an exemplary CAM process 120 is shown. The programming engine 16a, for example, utilizes a 16-entry cache or CAM 64 with a LRU replacement policy to store a list of recently used variables working on eight (8) active contexts or threads at a time. The threads are executed in order, using a read phase 122 and a modify-write phase (not shown). During the read phase 122, a context requests a variable and the CAM 64 is checked to see if the needed variable is cached (124). If the CAM 64 indicates a hit, no read is necessary and the content of the CAM 64 gives the location of the variable in the CAM (126). Moreover, the updated value of the variable will be stored in the cache when this context becomes active for its modify-write phase, with the context reading the value directly from the CAM 64 (128).

On the other hand, if the CAM 64 indicates a miss during the read phase 122, a read of the needed variable is initiated (130). Consequently, the execution time of the remaining seven (7) contexts is being used to completely hide the latency of the read (132). Moreover, the variable is available at the modify write stage of this context (132). The write latency of the critical section is avoided since the variable is already valid in the CAM 64 if recently used. Next, the CAM is written or updated (134). The content of the CAM 64 provides the location of the LRU cached variable, with the new variable overriding the previously used variable (136).

Next, the context reads the value directly from the CAM 64 (136), and the context returns to the beginning of the read phase (122). Consequently, each programming engine becomes a pipeline stage, performing a specialized task of the packet processing, also monitoring the context or variable(s) used for particular tasks.

Context Pipelining

Figure 6:
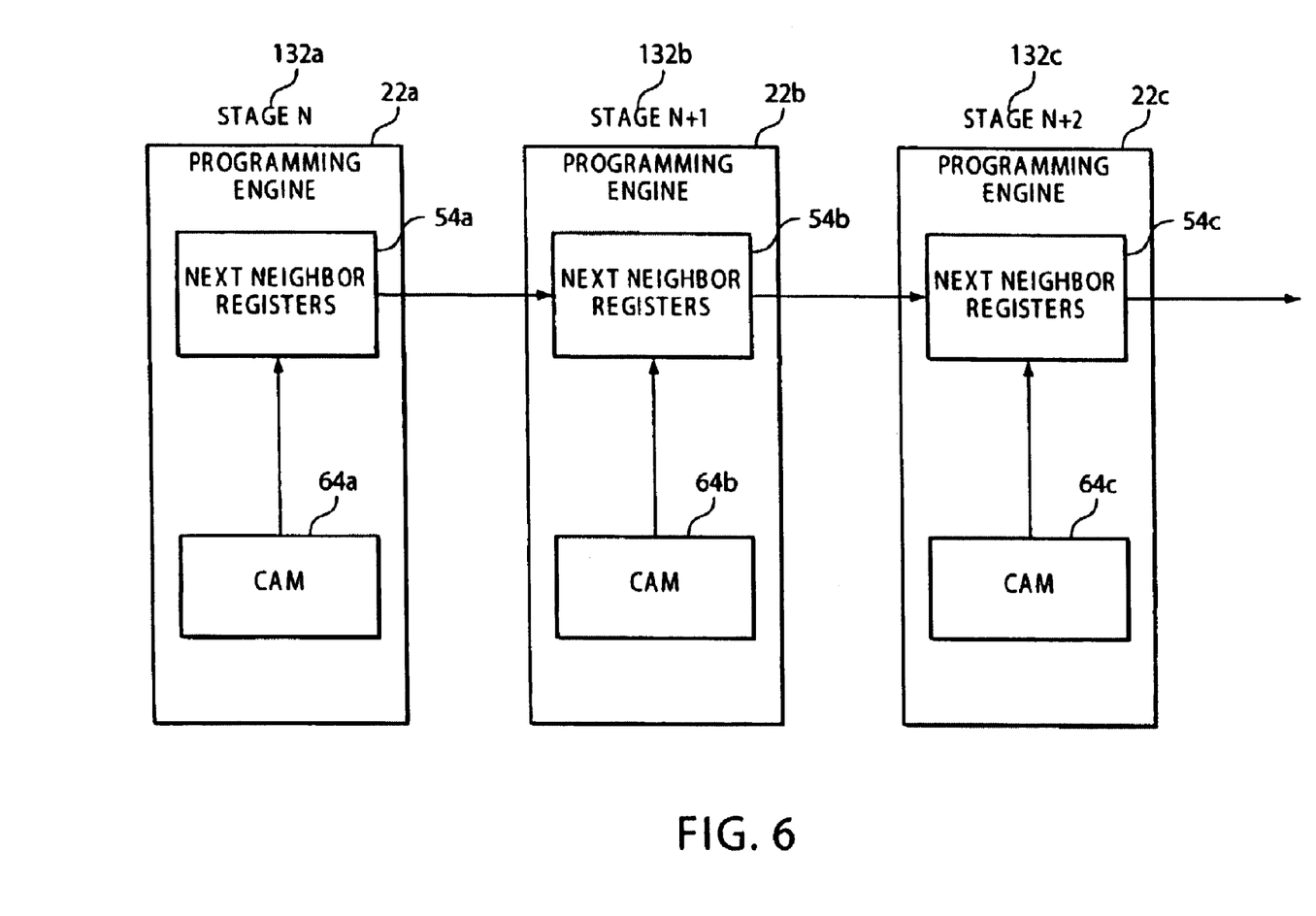
FIG. 6 is a simplified block diagram of a context pipeline process.

Referring to FIG. 6, a context pipeline 130 flow illustrates programming engines 16a–16h assigned to specific portions of a processing task of a packet or cell. The context for a specific assigned task is maintained on the programming engines 16a–16h using the CAM 64a–64c. The packets are processed in a pipelined fashion similar to an assembly line using the NN registers 54a–54c to pass data from one programming engine to a subsequent, adjacent programming engine. Data is passed from one stage 132a to a subsequent stage 132b and then from stage 132b to stage 132c of the pipeline, and so forth. In other words, data is passed to the next stage of the pipeline allowing the steps in the processor cycle to overlap. In particular, while one instruction is being executed, the next instruction can be fetched, which means that more than one instruction can be in the "pipe" at any one time, each at a different stage of being processed.

For example, data can be passed forward from one programming engine 16 to the next programming engine 16 in the pipeline using the NN registers 54a–54c. This method of implementing pipelined processing has the advantage that the information included in the CAM 64a–64c for each stage 132a–c is consistently valid for all eight contexts of the pipeline stage. The context pipeline method may be utilized when minimal data from the packet being processed must advance through the context pipeline 130.

OTHER EMBODIMENTS

It is to be understood that while the example above has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising:
   establishing programming stages, each programming stage comprising at least one programming engine; and
   at each programming stage,
      assigning one or more tasks for processing in the at least one programming engine,
      managing parallel processing of multiple tasks, including establishing a context for each of the multiple tasks, in which at least one of the multiple tasks requires execution of multiple instructions,
      switching from processing one of the multiple tasks to another of the multiple tasks based on execution of the instructions, and
      passing data associated with the multiple tasks to a subsequent programming stage upon completion of the multiple tasks.

2. The method of claim 1 wherein establishing contexts for the assigned tasks comprises providing a software controlled cache.

3. The method of claim 2 wherein the software controlled cache is a content addressable memory (CAM).

4. The method of claim 1, further comprising forming at least one next neighbor register residing in each of the programming engines.

5. The method of claim 4, further comprising establishing a plurality of pipelines, including transferring data from the at least one next neighbor register residing in one of the programming engines to a subsequent next neighbor register residing in an adjacent programming engine.

6. The method of claim 5 wherein the one of the programming engines maintains the currently operating programming stage of the pipeline and the adjacent programming engine maintains a subsequent programming stage of the plurality of pipelines.

7. The method of claim 1, further comprising modifying variables in the assigned tasks utilized in the programming stages by the programming engines.

8. The method of claim 7 wherein the variables are shared variables utilized by the programming engines of the programming stages and include a critical section defining the read-modify-write time of the shared variables.

9. The method of claim 8 further comprising defining a minimum resolution of the programming stage defined by the difference between the critical section of the shared variables and the arrival time of a subsequent packet wherein the critical section is less than the arrival time of the subsequent packet.

10. The method of claim 3 wherein each of the programming engines executes a plurality of contexts simultaneously.

11. The method of claim 10 wherein the plurality of contexts are executed in an order.

12. The method of claim 11 wherein the order includes a read phase and a write-modify phase.

13. The method of claim 12 wherein the CAM includes a plurality of entries for monitoring least recently used variables.

14. The method of claim 13 wherein the read phase includes determining the cache status of a shared variable in the CAM and updating a value for the shared variable if the shared variable is cached in the CAM.

15. The method of claim 13 wherein the read phase executes a read of the shared variable from a local memory in at least one of the plurality of contexts.

16. The method of claim 15 wherein the remaining plurality of contexts hide a latency time of the read by executing other assigned tasks for processing packets.

17. The method of claim 15 wherein the shared variable is cached in the CAM and is available for processing at the modify-write phase in the at least one of the plurality of contexts.

18. The method of claim 1 in which the at least one programming engine executes multiple instructions associated with a first one of the multiple tasks, and switches to a second one of the multiple tasks when an instruction associated with the first one of the multiple tasks comprises a long latency operation.

19. The method of claim 1 in which the at least one programming engine executes multiple instructions associated with a first one of the multiple tasks, and switches to a second one of the multiple tasks when an instruction associated with the first one of the multiple tasks requires access to memory.

20. A processor comprising:
  programming engines arranged in programming stages, and at each programming stage, at least one programming engine to perform:
    receiving tasks for processing,
    managing parallel processing of multiple tasks, including establishing a context for each of the multiple tasks, in which at least one of the multiple tasks requires execution of multiple instructions,
    switching from processing one of the multiple tasks to another of the multiple tasks based on execution of the instructions, and
    passing data associated with the tasks to a subsequent programming stage upon completion of the tasks.

21. The processor of claim 20 wherein each of the programming engines includes next neighbor registers for transferring data from a next neighbor register residing in a programming engine to a subsequent next neighbor register residing in a subsequent programming engine.

22. The processor of claim 21 wherein each of the programming engines includes a content addressable memory (CAM).

23. The processor of claim 22 wherein the CAM includes a plurality of entries for monitoring least recently used variables.

24. The processor of claim 22, further comprising shared variables utilized by the programming stages of the plurality of programming engines, the shared variables including a critical section defining the read-modify-write time of the shared variables.

25. The processor of claim 24, further comprising a minimum resolution of the programming stage defined by the difference between the critical section of the shared variables and the arrival time of a subsequent packet wherein the critical section is less than the arrival time of the subsequent packet.

26. The processor of claim 22 wherein the plurality of contexts are executed in order, the order including a read phase and a write-modify phase, wherein the read phase includes determining the cache status of a shared variable in the CAM and updating a value for the shared variable if the shared variable is cached in the CAM, and wherein the read phase executes a read of the shared variable from a local memory in at least one of the plurality of contexts.

27. A computer program product stored on a computer readable medium, the program comprising instructions for causing a parallel processor to:
  establish programming stages, each programming stage comprising at least one programming engine; and
  at each programming stage,
    assign tasks for processing in the at least one programming engine;
    manage parallel processing of multiple tasks, including establishing a context for each of the multiple tasks, in which at least one of the multiple tasks requires execution of multiple instructions,
    switch from processing one of the multiple tasks to another of the multiple tasks based on execution of the instructions, and
    pass data associated with the tasks to a subsequent programming stage upon completion of the tasks.

28. The computer program product of claim 27 wherein the instructions for establishing contexts for the assigned tasks comprises providing a software controlled cache.

29. The computer program product of claim 27, further comprising instructions to establish a plurality of pipelines and form at least one next neighbor register residing in each of the programming engines, wherein the instructions to establish the plurality of pipelines include one or more instructions to transfer data from the at least one next neighbor register residing in one of the programming engines to a subsequent next neighbor register residing in an adjacent programming engine.

30. The computer program product of claim 27, further comprising instructions to transfer data from a next neighbor register residing in a programming engine to a subsequent next neighbor register residing in an adjacent programming engine.

31. The computer program product of claim 27, further comprising instructions to utilize shared variables of the programming stages that include a critical section defining the read-modify-write time of the variables.

32. A computer program product stored on a computer readable medium, the program comprising instructions for causing programming engines to:
  perform specific tasks for packet processing;
  arrange in programming stages, each comprising at least one programming engine; and
  for at least one programming engine,
    manage parallel processing of multiple tasks, including establish a context for each of the multiple tasks, in which at least one of the multiple tasks requires execution of multiple instructions, switch from processing one of the multiple tasks to another of the multiple tasks based on execution of the instructions, and pass data associated with the multiple tasks to a subsequent programming stage.

33. A multiprocessing system comprising:

a plurality of programming engines configured to process data packets, the plurality of programming engines arranged in a plurality of programming stages wherein at least one programming engine manages parallel processing of multiple tasks, including establishing a context for each of the multiple tasks, in which at least one of the tasks requires execution of multiple instructions, switches from processing one task to another task based on execution of the instructions, and passes data associated with the tasks to a subsequent programming stage upon completion of the tasks.

34. The multiprocessing system of claim 33 wherein each of the plurality of programming engines includes next neighbor registers for transferring data to a subsequent next neighbor register residing in an adjacent programming engine.

35. The multiprocessing system of claim 33, further comprising shared variables utilized by the programming stages of the plurality of programming engines, the shared variables including a critical section defining the read-modify-write time of the shared variables.

36. The multiprocessing system of claim 33 wherein each of the plurality of programming engines includes a content addressable memory (CAM).

37. The multiprocessing system of claim 36 wherein the CAM includes a plurality of entries for monitoring least recently used variables.

38. The multiprocessing system of claim 35 further comprising a minimum resolution of the programming stage defined by the difference between the critical section of the shared variables and the arrival time of a subsequent packet wherein the critical section is less than the arrival time of the subsequent packet.

* * * * *